(12) United States Patent
Kim

(10) Patent No.: US 9,020,676 B2
(45) Date of Patent: Apr. 28, 2015

(54) METHOD AND SYSTEM FOR CONTROLLING DRIVE TORQUE OF VEHICLE

(71) Applicants: Hyundai Motor Company, Seoul (KR); Kia Motors Corporation, Seoul (KR)

(72) Inventor: Sang Joon Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/067,138

(22) Filed: Oct. 30, 2013

(65) Prior Publication Data

US 2014/0163792 A1    Jun. 12, 2014

(30) Foreign Application Priority Data

Dec. 7, 2012    (KR) .................... 10-2012-0142068

(51) Int. Cl.
*G05D 17/00* (2006.01)
*B60W 20/00* (2006.01)
*B60W 10/06* (2006.01)
*B60W 10/08* (2006.01)
*B60K 6/48* (2007.10)

(52) U.S. Cl.
CPC ............... *G05D 17/00* (2013.01); *B60W 10/06* (2013.01); *B60W 10/08* (2013.01); *B60W 20/10* (2013.01); *Y10S 903/93* (2013.01); *B60K 2006/4825* (2013.01); *B60K 2350/1092* (2013.01); *B60W 2710/083* (2013.01); *B60W 2710/1033* (2013.01)

(58) Field of Classification Search
CPC ..... B60W 10/06; B60W 10/08; B60W 20/10; Y10S 903/93; G05D 17/00
USPC .......................................................... 701/22
See application file for complete search history.

(56) References Cited

U.S. PATENT DOCUMENTS 5,343,970 A * 9/1994 Severinsky ................. 180/65.25
5,841,201 A * 11/1998 Tabata et al. ................. 290/40 C (Continued)

FOREIGN PATENT DOCUMENTS

JP    2008-074336 A    4/2008
JP    2011057115 A    3/2011

(Continued)

OTHER PUBLICATIONS

Machine Translation of JP 2008-074336 published Apr. 3, 2008.*

*Primary Examiner* — Mary Cheung
*Assistant Examiner* — Anne Mazzara
(74) *Attorney, Agent, or Firm* — Mintz Levin Cohn Ferris Glovsky and Popeo, P.C.; Peter F. Corless

(57) ABSTRACT

A method and a system that control a drive torque of a vehicle in which there is a change in a torque of a predetermined magnitude when drive power of the vehicle enters a zone in which a predetermined maximum output is generated to allow a driver to feel that the drive power of the vehicle enters the maximum output zone during traveling. The method may include calculating, by a controller, a drive request torque of a vehicle and calculating drive power displayed on a drive power gauge of an instrument cluster based on the calculated drive request torque. In addition, the method may include adding, by the controller, a predetermined additional torque to the drive request torque when the calculated drive power displayed on the drive power gauge enters a predetermined zone of the drive power gauge.

10 Claims, 7 Drawing Sheets

(56) References Cited

U.S. PATENT DOCUMENTS

| | | | |
|---|---|---|---|
| 7,906,863 B2 * | 3/2011 | Yaguchi | 290/40 B |
| 2005/0055140 A1 * | 3/2005 | Brigham et al. | 701/22 |
| 2010/0022348 A1 * | 1/2010 | Jonsson | 477/52 |
| 2010/0323844 A1 * | 12/2010 | Okubo et al. | 477/3 |
| 2012/0035793 A1 * | 2/2012 | Kang et al. | 701/22 |
| 2012/0078476 A1 * | 3/2012 | Li et al. | 701/51 |

FOREIGN PATENT DOCUMENTS

| | | |
|---|---|---|
| JP | 2012136191 A | 7/2012 |
| KR | 10-0257020 | 8/2000 |
| KR | 10-2009-0115514 | 11/2009 |

* cited by examiner

METHOD AND SYSTEM FOR CONTROLLING DRIVE TORQUE OF VEHICLE

CROSS-REFERENCE TO RELATED APPLICATION

This application claims priority to and the benefit of Korean Patent Application No. 10-2012-0142068 filed in the Korean Intellectual Property Office on Dec. 7, 2012, the entire contents of which are incorporated herein by reference.

BACKGROUND (a) Field of the Invention

The present invention relates to a method and a system that control a drive torque of a vehicle, and more particularly, to a method and a system that control a drive torque of a vehicle in which there is a change in a torque of a predetermined magnitude when drive power of the vehicle enters a zone in which a predetermined maximum output is generated to allow a driver to feel that the drive power of the vehicle enters the maximum output zone during traveling.

(b) Description of the Related Art

As well known, an instrument cluster that provides travel information and various information items is installed in a vehicle. The instrument cluster commonly includes a speedometer that displays a travel speed of a vehicle, an engine tachometer that displays a rotation speed of an engine, and various warning lamps that display a vehicle error or failure.

In addition, the instrument cluster may include a drive power gauge (PG) that display drive power of a vehicle as shown in FIG. 1. In the drive power gauge PG, a boosting zone and/or an assist zone (BAZ) that displays a zone in which drive power is increased may be formed. The BAZ is mainly installed within a hybrid vehicle that uses an efficient combination of engine power and drive motor power.

A hybrid vehicle may include, for example, as shown in FIG. 2, an engine 10, a drive motor 20, an engine clutch 30 that interrupts power between the engine 10 and the drive motor 20, a transmission 40, a differential gear 50, a battery 60, an integrated starter-generator 70 that starts the engine 10 or generates power by a torque of the engine 10, and wheels 80.

In addition, the hybrid vehicle may include a hybrid control unit (HCU) 200 that operates the hybrid vehicle, an engine control unit (ECU) 110 that operates the engine 10, a motor control unit (MCU) 120 that operates the drive motor 20, a transmission control unit (TCU) 140 that operates the transmission 40, and a battery control unit (BCU) 160 that manages the battery 60.

The BCU 160 may be referred to as a battery management system (BMS). The integrated starter-generator 70 may be referred to as an integrated starter and generator (ISG) or a hybrid starter and generator (HSG).

The above-described hybrid vehicle may be driven in travel modes such as an electric vehicle (EV) mode that is a pure hybrid vehicle mode in which only the power of the drive motor 20 is used, a hybrid electric vehicle (HEV) mode in which torque of the engine 10 is used as main power and torque of the drive motor 20 is used as auxiliary power, and a regenerative braking (RB) mode in which brake and inertia energy is collected by power generation of the drive motor 20 to be charged in the battery 60 when a vehicle is stopped (e.g., the vehicle brake is engaged) or travels by inertia.

As described above, since the hybrid vehicle uses mechanical energy of the engine and electrical energy of the battery together and optimal operation regions of the engine and the drive motor and collects energy by the drive motor when stopped, fuel consumption may be enhanced and energy may be efficiently used.

Although the drive power gauge is installed in the instrument cluster of the above-described hybrid vehicle or a common vehicle, when a driver watch the instrument cluster, it may be difficult to recognize whether the corresponding vehicle travels in the BAZ.

The above information disclosed in this section is only for enhancement of understanding of the background of the invention and therefore it may contain information that does not form the prior art that is already known in this country to a person of ordinary skill in the art.

SUMMARY

The present invention provides a method and a system that control a drive torque of a vehicle in which there is a change in a torque of a predetermined magnitude when drive power of the vehicle enters a zone in which a predetermined maximum output is generated allowing a driver to feel that the drive power of the vehicle enters the maximum output zone during traveling.

According to an exemplary embodiment of the present invention, a method of controlling a drive torque of a vehicle, may include: calculating a drive request torque of a vehicle, calculating drive power displayed on a drive power gauge of an instrument cluster based on the calculated drive request torque, and adding a predetermined additional torque to the drive request torque when the calculated drive power displayed on the drive power gauge enters a predetermined zone of the drive power gauge.

The addition of a predetermined additional torque may be maintained for a predetermined time. Further, the addition of the predetermined additional torque may be maintained while the calculated drive power displayed on the drive power gauge is in the predetermined zone of the drive power gauge. A magnitude of the predetermined additional torque may be determined to allow a driver to feel the predetermined additional torque and may be set to be about 5 to 10% of the drive request torque.

The vehicle may be a hybrid vehicle that uses an efficient combination of power of an engine and power of a drive motor. The method may further include distributing a torque obtained by adding the drive request torque and the predetermined additional torque to the engine and the drive motor In another embodiment, a system that controls a drive torque of a vehicle, may include: a vehicle speed sensor that detects a vehicle speed, an accelerator pedal sensor (APS) that detects a position of an accelerator pedal, an instrument cluster that provides travel information and state information of the vehicle, and a drive torque control unit that adds a predetermined additional torque to a drive request torque when drive power of the vehicle enters a predetermined zone of a drive power gauge of the instrument cluster based on signals of the vehicle speed sensor and the accelerator pedal sensor. The drive torque control unit may be operated by a predetermined program that performs the method of controlling the drive torque of the vehicle according to the exemplary embodiment of the present invention.

The drive torque control unit may include: a drive request torque mapping unit that maps a drive request torque corresponding to signals of the vehicle speed sensor and the accelerator pedal sensor, a drive power calculating unit that calculates drive power based on data of the drive request torque mapping unit and the signal of the vehicle speed sensor, a filtering unit that filters the drive power calculated by the drive power calculating unit by a signal displayed on the drive power gauge of the instrument cluster, an additional torque calculating unit that calculates an additional torque to be added to the drive request torque based on a drive power display signal output by the filtering unit, an adding unit that adds the additional torque calculated by the additional torque calculating unit and the drive request torque mapped by the drive request torque mapping unit, and a power distributing unit that distributes the added torque output by the adding unit to the engine and the drive motor.

As described above, according to the exemplary embodiment of the present invention, a torque of a predetermined magnitude may be changed when drive power of a vehicle enters a zone in which a predetermined maximum output is generated during traveling allowing a driver to feel that the drive power of the vehicle enters the maximum output zone.

DETAILED DESCRIPTION OF THE EMBODIMENTS

Figure 1:
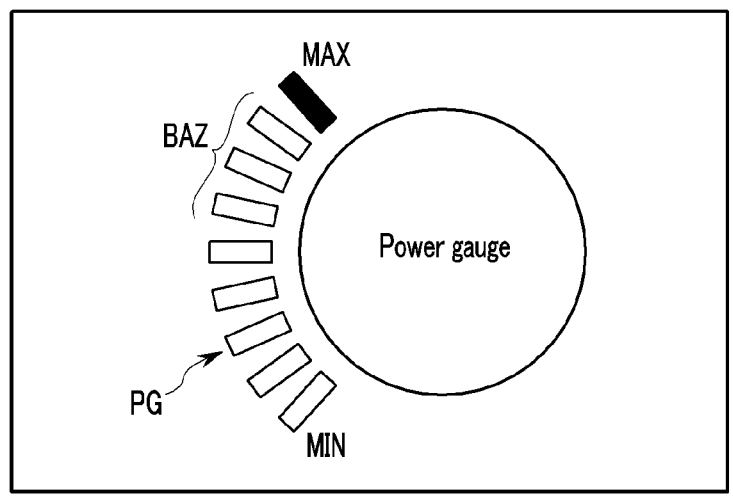
FIG. 1 is an exemplary schematic view showing a drive power gauge according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will be described more fully hereinafter with reference to the accompanying drawings, in which exemplary embodiments of the invention are shown. However, the present invention is not limited to the exemplary embodiments described hereinafter but may be specified in other forms. In addition, in the entire specification, when it is referred that a part includes a certain constituent element, unless described to the contrary, it does not mean that other constituent elements are excluded but means that the constituent element may be further included. In the entire specification, the same reference numerals represent the same constituent elements.

Figure 2:
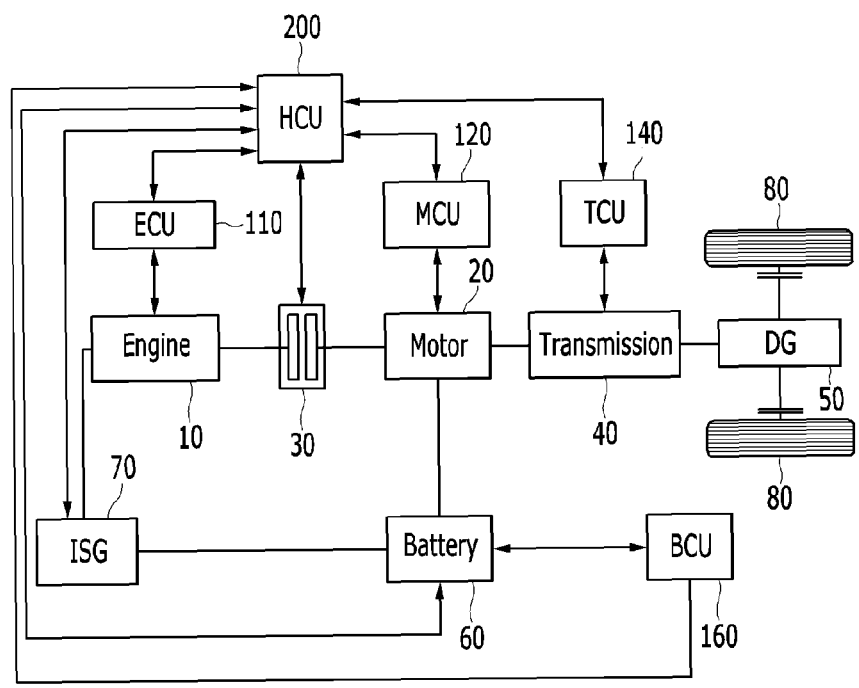
FIG. 2 is an exemplary block diagram showing a structure of a common hybrid vehicle according to the related art.

FIG. 2 is an exemplary view schematically showing a hybrid vehicle to which a drive torque control system according to an exemplary embodiment of the present invention is applied.

Hereinafter, it is described that a drive torque control system according to an exemplary embodiment of the present invention is applied to a hybrid vehicle. However, it should be understood that the scope of the present invention is not limited thereto. The present invention may be applied not only to a hybrid vehicle but also to a common vehicle that uses only power of an engine or a pure electric vehicle that uses only power of a drive motor.

As shown in FIG. 2, a hybrid vehicle to which a drive torque control system according to an exemplary embodiment of the present invention is applied may include an engine 10, a motor 20, an engine clutch 30 configured to interrupt power between the engine 10 and the motor 20, a transmission 40, a differential gear 50, a battery 60, and an integrated starter-generator 70 configured to start the engine 10 or generate power by an output of the engine 10.

In addition, the hybrid vehicle to which the drive torque control system according to the exemplary embodiment of the present invention is applied may include a hybrid control unit (HCU) 200 configured to operate the hybrid vehicle, an engine control unit (ECU) 110 configured to operate the engine 10, a motor control unit (MCU) 120 configured to operate the drive motor 20, a transmission control unit (TCU) 140 configured to operate the transmission 40, and a battery control unit (BCU) 160 configured to manage the battery 60.

Figure 3:
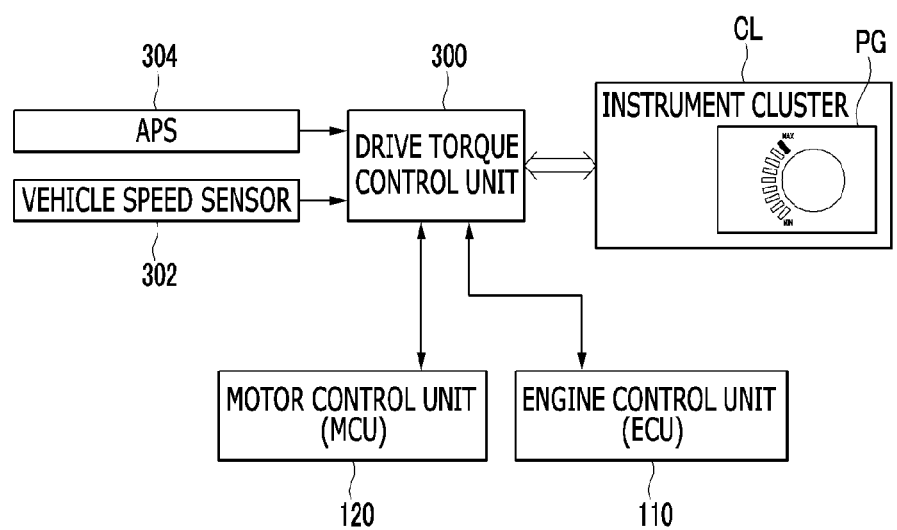
FIG. 3 is an exemplary block diagram showing a system that controls a drive torque of a vehicle according to an exemplary embodiment of the present invention.

FIG. 3 is an exemplary block diagram showing a drive torque control system according to an exemplary embodiment of the present invention.

A drive torque control system according to an exemplary embodiment of the present invention may add a predetermined torque to a drive request torque when drive power of a hybrid vehicle is in a predetermined zone (e.g., a boosting zone and/or an assist zone (BAZ) of a drive power gauge of an instrument cluster to drive the engine and/or the drive motor. In the drive torque control system, although a driver may not be watching the instrument cluster, the driver may feel that the vehicle is traveling in the BAZ.

The drive torque control system according to the exemplary embodiment of the present invention may include a vehicle speed sensor 302 configured to detect a vehicle speed, an accelerator position sensor (APS) 304 configured to detect a position of an accelerator pedal, an instrument cluster (CL) configured to provide travel information and state information of a hybrid vehicle, and a drive torque control unit 300 configured to add a predetermined torque to a drive request torque when drive power of the hybrid vehicle is in a predetermined zone (BAZ) of the drive power gauge (PG) of the CL based on signals of the vehicle speed sensor 302 and the APS 304.

According to the exemplary embodiment of the present, the vehicle speed sensor 302 may be, for example, a vehicle speed sensor attached to a wheel to detect a rotation speed or, for example, a vehicle speed sensor attached to a final reduction gear of the transmission. However, it should be understood that the scope of the present invention is not limited thereto. Although another vehicle speed sensor may be used, the spirit of the present invention may be applied to any sensor that enables a value corresponding to an actual vehicle speed to be calculated.

The APS 304 may be a sensor interlocked to an accelerator pedal to detect a position of the accelerator pedal. The CL may include the drive PG shown in FIG. 1. The drive PG may include the BAZ as described with reference to FIG. 1.

Furthermore, the drive torque control unit (e.g., a controller) 300 may include at least one microprocessor operated by a predetermined program or hardware including the microprocessor. The predetermined program may be formed of a series of commands that perform a later-described drive torque control method according to an exemplary embodiment of the present invention.

According to the exemplary embodiment of the present invention, as shown in FIG. 2, the drive torque control unit 300 may include an engine control unit (ECU) configured to operate the engine 10 of the hybrid vehicle, a motor control unit (MCU) configured to operate the drive motor 20, and a hybrid control unit (HCU) configured to operate the hybrid vehicle.

Figure 4:
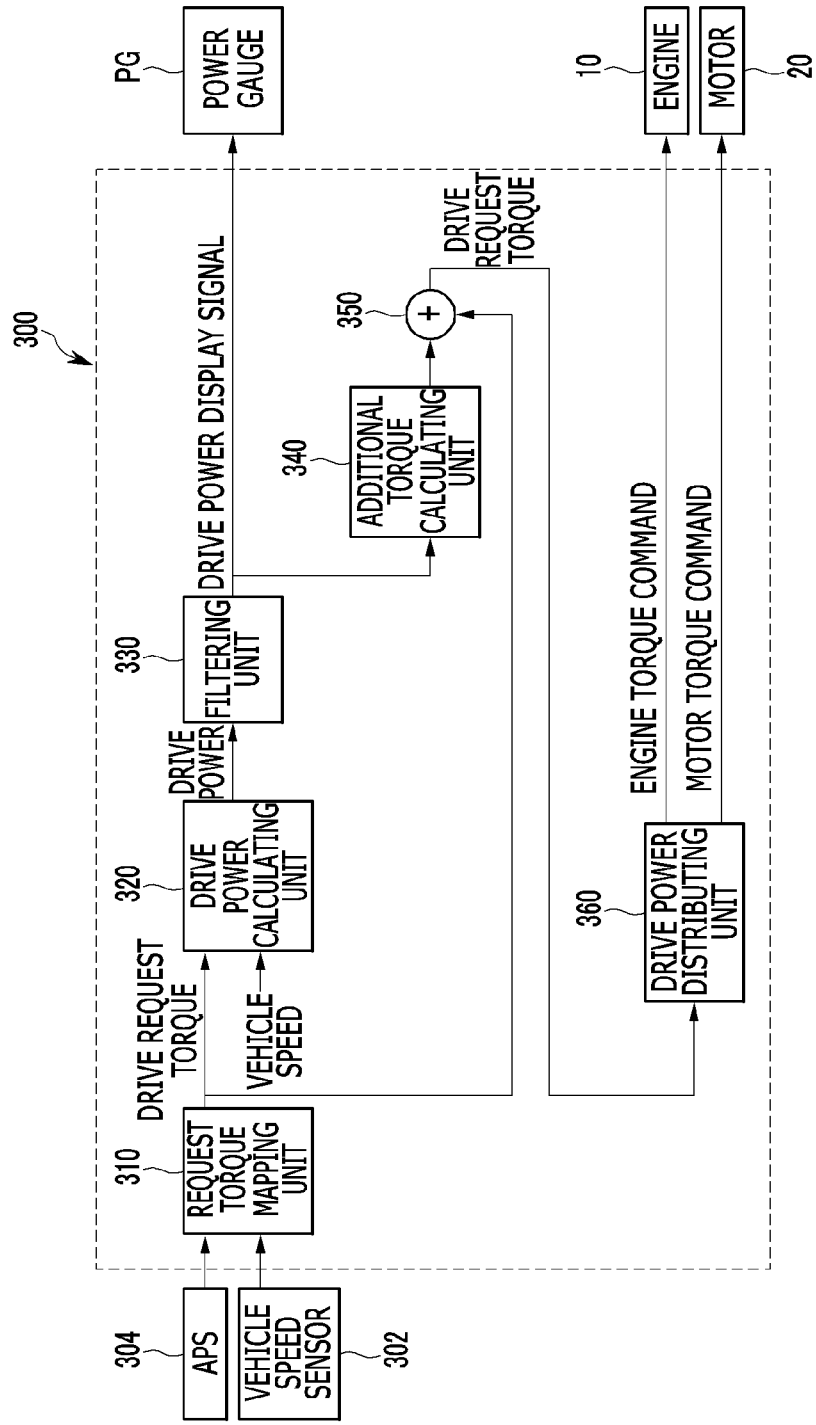
FIG. 4 is an exemplary detailed block diagram showing a drive torque control unit according to an exemplary embodiment of the present invention.

In the later-described drive torque control method according to the exemplary embodiment of the present invention, partial processes may be performed by the drive torque control unit 300 and other partial processes may be performed the ECU, the MCU, or the HCU. However, it should be understood that the scope of the present invention is not limited to description of later-described embodiments. A control unit may be configured by a combination different from that described in the exemplary embodiment of the present invention. The drive torque control unit 300, the ECU, the MCU, and the HCU may perform processes of a combination different from that described in the exemplary embodiment of the present invention. On the other hand, the drive torque control unit 300 may be formed of a detailed block as shown in FIG. 4.

In other words, the drive torque control unit 300 may include a drive request torque mapping unit 310 configured to map a drive request torque corresponding to signals of the vehicle speed sensor 302 and the APS 304, a drive power calculating unit 320 configured to calculate drive power based on data of the drive request torque mapping unit 310 and the signal of the vehicle speed sensor 302, a filtering unit 330 configured to filter the drive power calculated by the drive power calculating unit 320 by a signal displayed on the drive PG of the CL, an additional torque calculating unit 340 configured to calculate an additional torque to be added to the drive request torque based on a drive power display signal output by the filtering unit 330, an adding unit 350 configured to add the additional torque calculated by the additional torque calculating unit 340 and the drive request torque mapped by the drive request torque mapping unit 310, and a power distributing unit 360 configured to distribute the added torque output by the adding unit 350 to the engine 10 and/or the drive motor 20.

Hereinafter, a method of controlling a drive torque of a hybrid vehicle according to an exemplary embodiment of the present invention will be described in detail with reference to the accompanying drawings.

Figure 5:
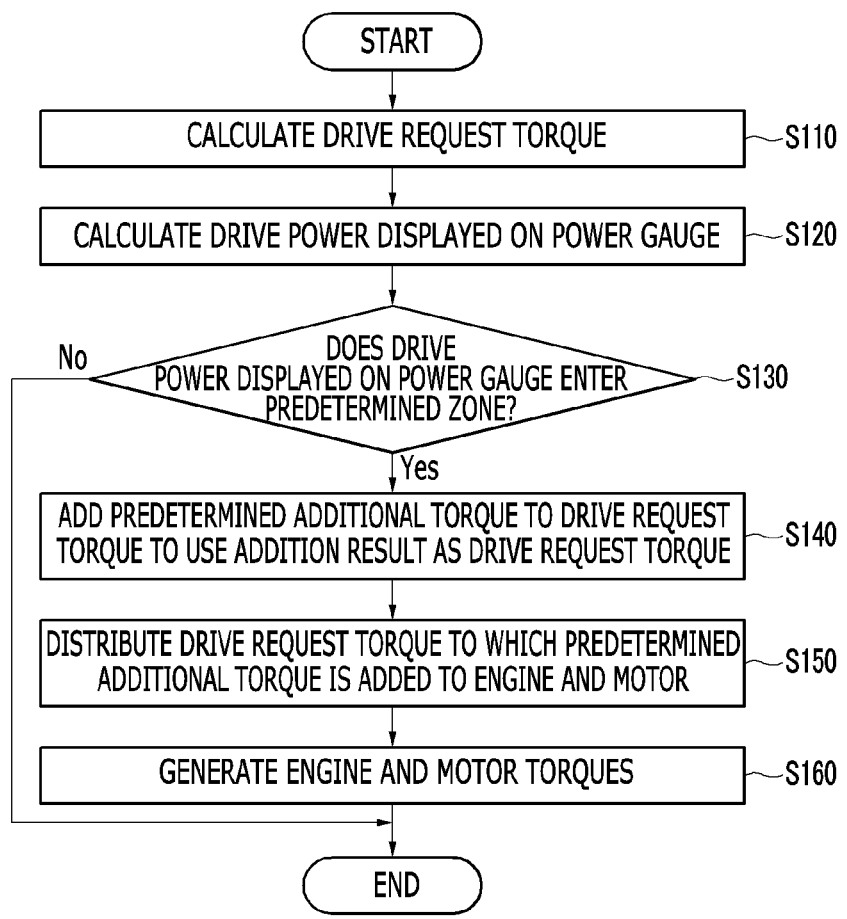
FIG. 5 is an exemplary flowchart of a method of controlling a drive torque of a vehicle according to an exemplary embodiment of the present invention.

FIG. 5 is an exemplary flowchart showing a method of controlling a drive torque of a hybrid vehicle according to an exemplary embodiment of the present invention. As shown in FIG. 5, the drive torque control unit 300 may be configured to calculate a drive request torque of a hybrid vehicle based on signals of the vehicle speed sensor 302 and the APS 304. The drive request torque may be a torque requested by a driver.

When the signals of the vehicle speed sensor 302 and the APS 304 are input, the drive torque control unit 300 may be configured to confirm the drive request torque corresponding to the signals by the drive request torque mapping unit 310. Next, the drive torque control unit 300 may be configured to calculate drive power corresponding to the drive request torque based on the drive request torque confirmed by the drive request torque mapping unit 310 and the signal of the vehicle speed sensor 302 through the drive power calculating unit 320 S120.

The calculated drive power may be displayed on the drive PG of the CL. When the drive power displayed on the drive PG is calculated by the drive power calculating unit 320, the filtering unit 330 of the drive torque control unit 300 may be configured to filter the calculated drive power by the signal displayed on the drive PG to output the filtered drive power. The drive power signal filtered by the filtering unit 330 may be input to the drive PG to be used for displaying drive power.

When the drive power is calculated in S120, the additional torque calculating unit 340 of the drive torque control unit 300 may be configured to determine whether the drive power has a magnitude in which the drive power is in the predetermined zone (e.g., the BAZ) of the drive PG based on the drive power signal output by the filtering unit 330 S130. In response to determining in S130 that the drive power has a magnitude in which the drive power is in the predetermined zone, the additional torque calculating unit 340 of the drive torque control unit 300 may be configured to calculate an additional torque added to the drive request torque based on the drive power signal S140. The magnitude of the additional torque may be determined to allow a driver to feel the additional torque and may be set to, for example, about 5 to 10% of that of the drive request torque.

Figure 6:
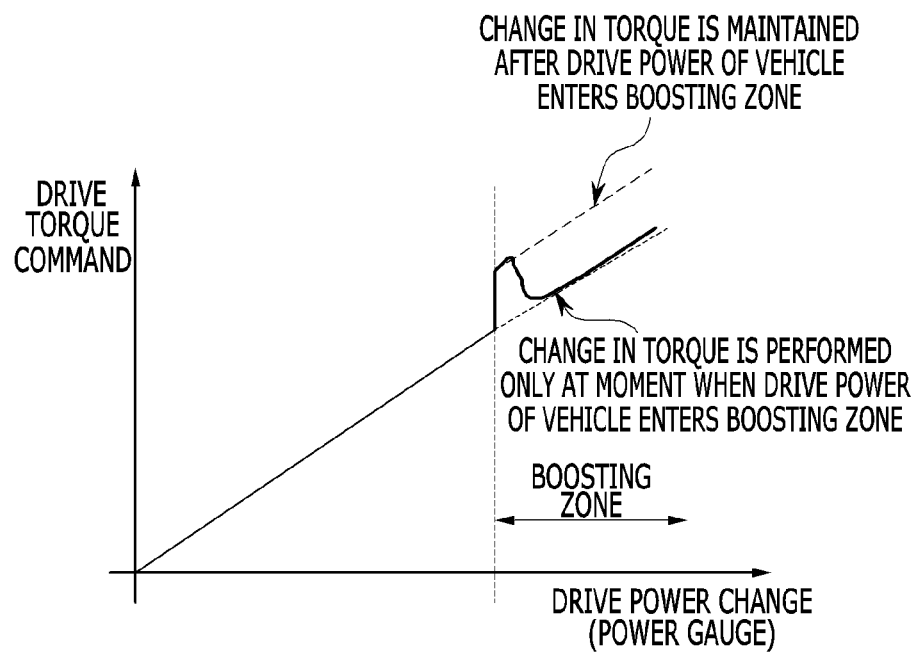
FIGS. 6 and 7 are exemplary graphs showing operations of an exemplary embodiment of the present invention.

The additional torque calculating unit 340 may be configured to add the calculated additional torque to the drive request torque only for a predetermined time (e.g., one second) as shown in FIG. 6. The additional torque calculating unit 340 may be configured to continuously add the calculated additional torque to the drive request torque as shown in FIG. 6. When the calculated additional torque is added to the drive request torque, since a torque and a vehicle speed may momentarily change as shown in FIGS. 6 and 7, the driver may feel that drive power of the vehicle enters a power driving zone without looking at the instrument cluster.

When the additional torque is calculated by the additional torque calculating unit 340, the adding unit 350 of the drive torque control unit 300 may be configured to add the additional torque and the drive request torque. The torque added by the adding unit 350 may be input to the power distributing unit 360 of the drive torque control unit 300. When the added torque is input to the power distributing unit 360, the power distributing unit 360 may be configured to apply an engine torque command and a motor torque command to the engine 10 and the drive motor 20 to generate a torque in a predetermined ratio S150.

Figure 7:
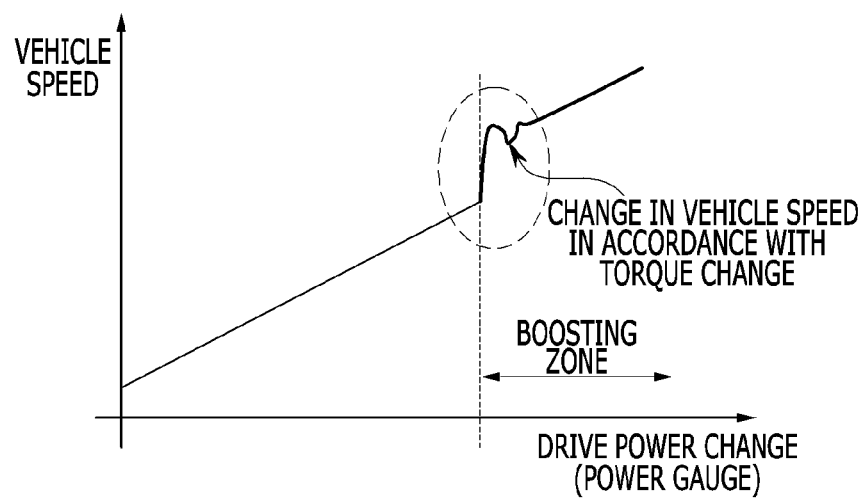

When the distributed engine torque command and motor torque command are applied to the engine 10 and the drive motor 20, the engine 10 and the drive motor 20 may be configured to generate a corresponding torque to generate a change in the drive torque and the speed as shown in FIGS. 6 and 7 S160. Therefore, according to the exemplary embodiment of the present invention, the driver may feel that the drive power of the vehicle enters the power driving zone without looking at the instrument cluster.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| Description of symbols | |
|---|---|
| 10: engine | 20: drive motor |
| 110: engine control unit (ECU) | 120: motor control unit (MCU) |
| 300: drive torque control unit | 302: vehicle speed sensor |
| 304: accelerator pedal sensor (APS) | CL: instrument clutch |
| PG: drive power gauge | |

What is claimed is:

1. A method of controlling a drive torque of a vehicle, comprising:
    calculating, by a controller, a drive request torque of the vehicle;
    calculating, by the controller, drive power displayed on a drive power gauge of an instrument cluster based on the calculated drive request torque;
    adding, by the controller, a predetermined additional torque to the drive request torque when the calculated drive power displayed on the drive power gauge enters a predetermined zone of the drive power gauge;
    mapping, by the controller, the drive request torque corresponding to signals of the vehicle speed sensor and the accelerator pedal sensor;
    calculating, by the controller, drive power based on the mapped data of the drive request and the signal of the vehicle speed sensor;
    filtering, by the controller, the calculated drive power by a signal displayed on the drive power gauge of the instrument cluster;
    calculating, by the controller, an additional torque to be added to the drive request torque based on an output drive power display signal;
    adding, by the controller, the calculated additional torque unit and the mapped drive request torque; and
    distributing, by the controller, the output added torque to the engine and the drive motor.

2. The method of claim 1, wherein addition of the predetermined additional torque is maintained for a predetermined time.

3. The method of claim 1, wherein addition of the predetermined additional torque is maintained while the calculated drive power displayed on the drive power gauge is in the predetermined zone of the drive power gauge.

4. The method of claim 1, wherein a magnitude of the predetermined additional torque is determined to allow a driver to feel the predetermined additional torque and is set to be about 5 to 10% of that of the drive request torque.

5. The method of claim 1, wherein the vehicle is a hybrid vehicle that uses an efficient combination of power of an engine and power of a drive motor and further includes:
    distributing, by the controller, a torque obtained by adding the drive request torque and the predetermined additional torque to the engine and the drive motor.

6. A system that controls a drive torque of a vehicle, comprising:
    a vehicle speed sensor configured to detect a vehicle speed;
    an accelerator pedal sensor configured to detect a position of an accelerator pedal;
    an instrument cluster configured to provide travel information and state information of the vehicle; and
    a drive torque control unit configured to:
        calculate a drive request torque of a vehicle;
        calculate drive power displayed on a drive power gauge of an instrument cluster based on the calculated drive request torque;
        add a predetermined additional torque to a drive request torque when drive power of the vehicle enters a predetermined zone of a drive power gauge of the instrument cluster based on signals of the vehicle speed sensor and the accelerator pedal sensor;
        map the drive request torque corresponding to signals of the vehicle speed sensor and the accelerator pedal sensor;
        calculate drive power based on the mapped data of the drive request and the signal of the vehicle speed sensor;
        filter the calculated drive power by a signal displayed on the drive power gauge of the instrument cluster;
        calculate an additional torque to be added to the drive request torque based on an output drive power display signal;
        add the calculated additional torque unit and the mapped drive request torque; and
        distribute the output added torque to the engine and the drive motor.

7. The system of claim 6, wherein the addition of the predetermined additional torque is maintained for a predetermined time.

8. The system of claim 6, wherein the addition of the predetermined additional torque is maintained while the calculated drive power displayed on the drive power gauge remains within the predetermined zone of the drive power gauge.

9. The system of claim 6, wherein a magnitude of the predetermined additional torque is set to be about 5% to 10% of that of the drive request torque.

10. The system of claim 6, wherein the vehicle is a hybrid vehicle that uses a combination of engine power and drive motor power and wherein the drive torque control unit is further configured to:
    distribute a torque obtained by adding the drive request torque and the predetermined additional torque to an engine and a drive motor.

* * * * *